United States Patent
Li et al.

(10) Patent No.: US 12,221,926 B2
(45) Date of Patent: Feb. 11, 2025

(54) MULTI-TEMPERATURE FUEL INJECTORS FOR A GAS TURBINE ENGINE

(71) Applicant: General Electric Company, Schenectady, NY (US)

(72) Inventors: Hejie Li, Mason, OH (US); Shai Birmaher, Cincinnati, OH (US); Michael A. Benjamin, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/805,986

(22) Filed: Jun. 8, 2022

(65) Prior Publication Data
US 2023/0399980 A1    Dec. 14, 2023

(51) Int. Cl.
*F02C 7/224* (2006.01)
*F02C 7/22* (2006.01)
*F02C 7/228* (2006.01)
*F02C 7/232* (2006.01)
*F23R 3/28* (2006.01)

(52) U.S. Cl.
CPC .............. *F02C 7/224* (2013.01); *F02C 7/222* (2013.01); *F02C 7/232* (2013.01); *F23R 3/28* (2013.01); *F02C 7/228* (2013.01)

(58) Field of Classification Search
CPC .......... F02C 7/224; F02C 7/222; F02C 7/232; F02C 7/228; F02C 7/236; F02C 7/12–185; F02C 9/26–46; F23R 3/30; F23R 3/32; F23R 3/34–36; F23R 3/28–286

See application file for complete search history.

(56) References Cited

U.S. PATENT DOCUMENTS

| | | | |
|---|---|---|---|
| 2,694,899 A * | 11/1954 | Hague | F02C 7/224 60/790 |
| 5,329,759 A | 7/1994 | Chan | |
| 5,450,725 A * | 9/1995 | Takahara | F23R 3/34 60/737 |
| 7,537,646 B2 | 5/2009 | Chen et al. | |
| 7,937,926 B2 | 5/2011 | Prociw et al. | |
| 8,037,688 B2 | 10/2011 | Hagen et al. | |
| 9,388,749 B2 | 7/2016 | MacDonald | |
| 9,656,762 B2 * | 5/2017 | Kamath | B64D 37/30 |

(Continued)

FOREIGN PATENT DOCUMENTS

| CA | 3000372 A1 | 11/2018 |
|---|---|---|
| GB | 946710 A | 1/1964 |

*Primary Examiner* — Stephanie Sebasco Cheng
(74) *Attorney, Agent, or Firm* — Venable LLP; David D. Leege; Michele V. Frank

(57) ABSTRACT

A gas turbine engine including a combustor, a plurality of fuel nozzles, and at least one fuel manifold. The combustor includes a combustion chamber. The plurality of fuel injects fuel into the combustion chamber of the combustor. The gas turbine engine may include a first fuel circuit and a second fuel circuit. The first fuel circuit includes a first fuel manifold fluidly connected to at least one fuel nozzle of the plurality of fuel nozzles to distribute the fuel to the at least one fuel nozzle at a first temperature. The second fuel circuit includes a second fuel manifold fluidly connected to at least one fuel nozzle of the plurality of fuel nozzles to distribute the fuel to the at least one fuel nozzle at a second. The second temperature is less than the first temperature.

18 Claims, 7 Drawing Sheets

(56) References Cited

U.S. PATENT DOCUMENTS

| | | | | |
|---|---|---|---|---|
| 10,100,748 B2* | 10/2018 | Kawai | ............... | F02C 9/40 |
| 10,107,499 B2* | 10/2018 | Graham | ............... | F02C 7/24 |
| 10,202,950 B2 | 2/2019 | Huwyler et al. | | |
| 10,215,097 B2* | 2/2019 | Miller | ............... | F02C 7/14 |
| 10,890,114 B2 | 1/2021 | Sweeney et al. | | |
| 11,028,783 B2 | 6/2021 | Chandler | | |
| 2013/0014514 A1* | 1/2013 | Romig | ............... | F02C 7/224 |
| | | | | 60/776 |
| 2014/0238041 A1* | 8/2014 | Crothers | ............... | F02C 7/222 |
| | | | | 60/725 |
| 2016/0245524 A1* | 8/2016 | Hill | ............... | F02C 9/34 |
| 2016/0305667 A1* | 10/2016 | Wolfe | ............... | F02C 7/224 |
| 2017/0298839 A1* | 10/2017 | Hill | ............... | F23R 3/346 |
| 2018/0066588 A1* | 3/2018 | Daly | ............... | F23K 5/06 |
| 2018/0135532 A1 | 5/2018 | Widener et al. | | |
| 2019/0249878 A1* | 8/2019 | Sadasivuni | ............... | F23N 5/242 |

\* cited by examiner

MULTI-TEMPERATURE FUEL INJECTORS FOR A GAS TURBINE ENGINE

TECHNICAL FIELD

The present disclosure relates to fuel systems for gas turbine engines, particularly, gas turbine engines for aircraft.

BACKGROUND

In gas turbine engines, fuel is injected into a combustion chamber using a fuel nozzle, mixed with air, and combusted to produce combustion products that drive turbines of the gas turbine engine. In aircraft, for example, this combustion produces thrust to propel the aircraft. The fuel may be heated upstream of the fuel nozzle and prior to being injected into the combustion chamber to improve the efficiency of the gas turbine engine (i.e., to reduce the amount of fuel burned), particularly, during operating conditions such as takeoff, climb and cruise.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
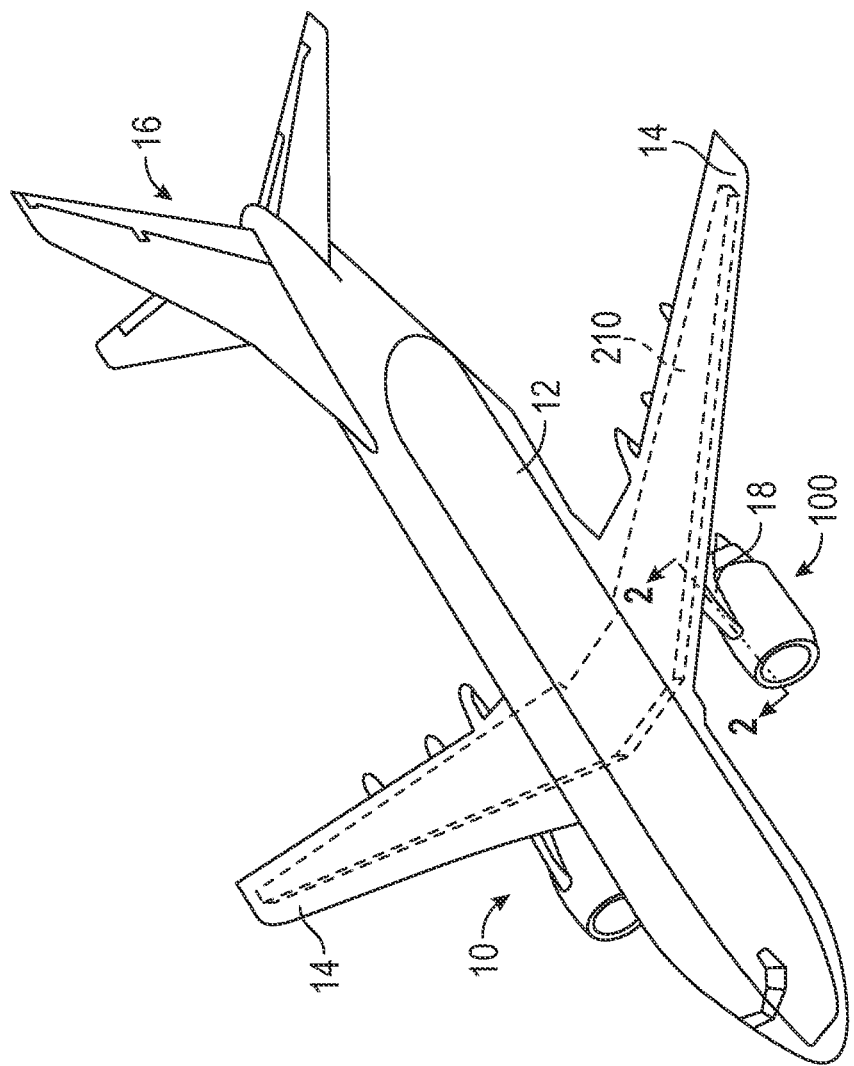
FIG. 1 is a schematic perspective view of an aircraft having a gas turbine engine according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet, and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "directly upstream" or "directly downstream," when used to describe the relative placement of components in a fluid pathway, refer to components that are placed next to each other in the fluid pathway without any intervening components between them other than an appropriate fluid coupling, such as a pipe, tube, valve, or the like, to fluidly couple the components. Such components may be spaced apart from each other with intervening components that are not in the fluid pathway.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and the claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, the fuel efficiency of a gas turbine engine can be improved by heating the fuel upstream of the fuel nozzle and prior to being injected into the combustion chamber, particularly, during operating conditions such as takeoff, climb, and cruise. Injecting the fuel into the combustion chamber at high temperatures can, however, lead to other issues. One such issue is a risk of flameout during a rapid reduction in the throttle, so-called chopping the throttle. One example is a pilot chopping the throttle from cruise to an idle condition for descent. During cruise, the fuel, the fuel nozzle, and other components are all at elevated temperatures. When the mass flow rate of the fuel through the nozzle is rapidly reduced during the chop to idle, the high temperature fuel may boil and vaporize, leading to fuel flow oscillations and, potentially, to a flameout of the combustor. To avoid this condition, fuel can be provided from a secondary fuel circuit to the nozzle at a reduced temperature.

The fuel system discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled, at least in part, based on a volume of fuel provided to the gas turbine engines 100 via a fuel system 200 (see FIG. 3). An aviation turbine fuel in the embodiments discussed herein is a combustible hydrocarbon liquid fuel, such as a kerosene-type fuel, having a desired carbon number. The fuel is stored in a fuel tank 210 of the fuel system 200. As shown in FIG. 1, at least a portion of the fuel tank 210 is located in each wing 14, and a portion of the fuel tank 210 is located in the fuselage 12 between the wings 14. The fuel tank 210, however, may be located at other suitable locations in the fuselage 12 or the wing 14. The fuel tank 210 may also be located entirely within the fuselage 12 or the wing 14. The fuel tank 210 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft, including, for example, helicopters and unmanned aerial vehicles (UAV). Preferably, the aircraft discussed herein are fixed-wing aircraft or rotor aircraft that generate lift by aerodynamic forces acting on, for example, a fixed wing (e.g., wing 14) or a rotary wing (e.g., a rotor of a helicopter) and are heavier-than-air aircraft, as opposed to lighter-than-air aircraft (such as a dirigible). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
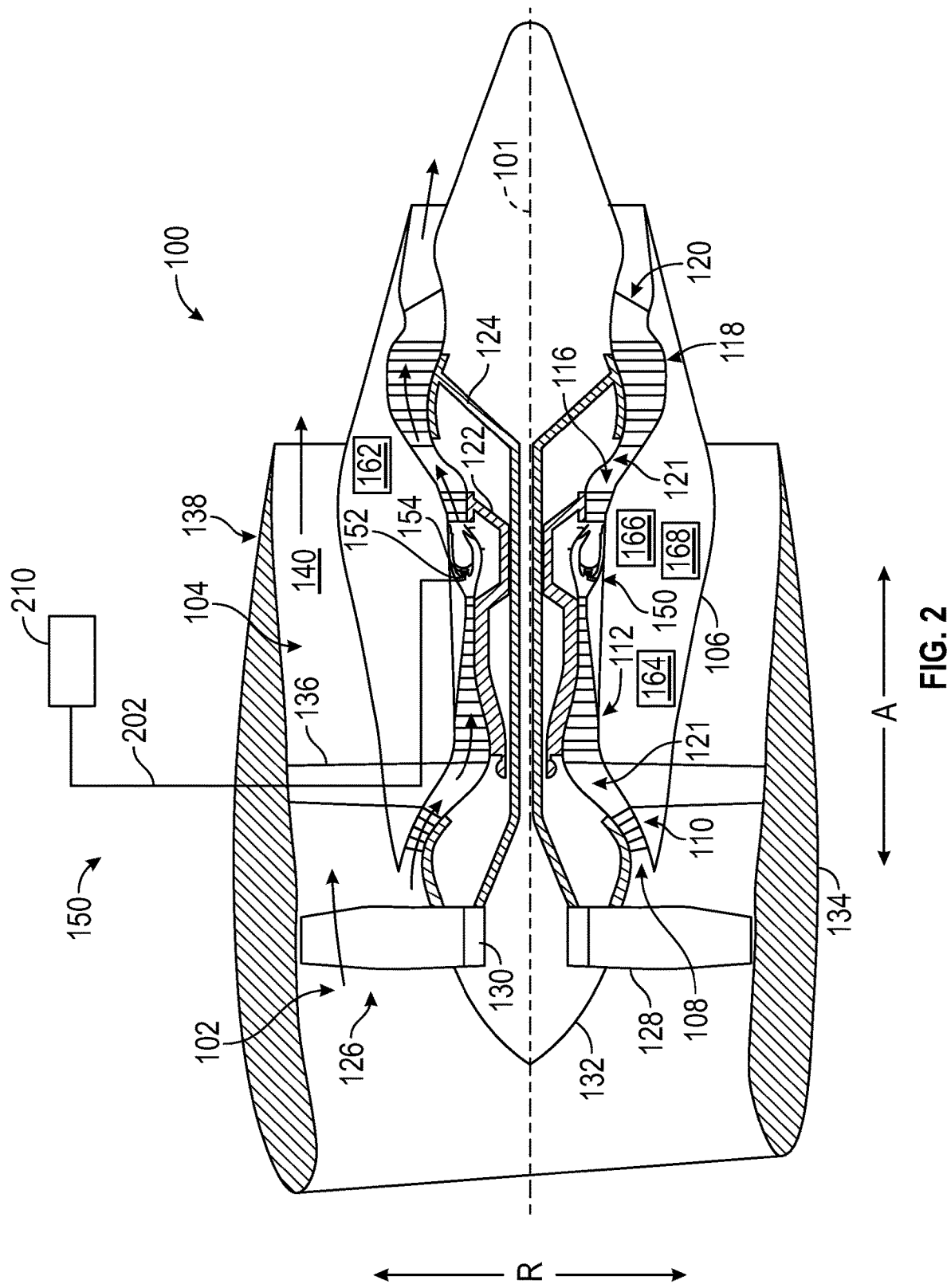
FIG. 2 is a schematic, cross-sectional view, taken along line 2-2 in FIG. 1, of the gas turbine engine of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R (extending perpendicular to the longitudinal centerline 101, shown for reference in FIG. 2), and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section, including a booster or low-pressure (LP) compressor 110 and a high-pressure (HP) compressor 112, a combustion section 150 (also referred to herein as a combustor 150), a turbine section including a high-pressure (HP) turbine 116 and a low-pressure (LP) turbine 118, and a jet exhaust nozzle section 120. The compressor section, the combustion section 150, and the turbine section together define, at least in part, a core air flowpath 121 extending from the inlet 108 to the jet exhaust nozzle section 120. The turbofan engine 100 further includes one or more drive shafts. More specifically, the turbofan engine 100 includes a high-pressure (HP) shaft or spool 122 drivingly connecting the HP turbine 116 to the HP compressor 112 and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130. The plurality of fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132, which is aerodynamically contoured to promote an airflow through the plurality of fan blades 128. Further, an annular fan casing or outer nacelle 134, circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 210 to the turbofan engine 100, and, more specifically, to a plurality of fuel nozzles 152 that inject fuel into a combustion chamber 154 of the combustor 150. Each fuel nozzle 152 may be positioned at the forward end of the combustion chamber 154, and each fuel nozzle 152 may be part of a swirler/fuel nozzle assembly. In some embodiments, the combustor 150 is an annular combustor 150, and the plurality of fuel nozzles 152 is arranged in an annular configuration with the plurality of fuel nozzles 152 (the swirler/fuel nozzle assemblies) aligned in a circumferential direction of the combustor. The swirler/fuel nozzle assemblies may also be referred to as cups, and the cups may be arranged adjacent to each other as will be discussed further below with reference to FIGS. 3 and 4.

As discussed above, the compressor section, the combustion section (combustor) 150, and the turbine section form, at least in part, the core air flowpath 121 extending from the inlet 108 to the jet exhaust nozzle section 120. Air entering through the inlet 108 is compressed by blades of a plurality of fans of the LP compressor 110 and the HP compressor 112. At least a portion of the compressed air enters (as primary air) the forward end of the combustion chamber 154 of the combustor 150. Fuel is injected by the fuel nozzles 152 into compressed air and mixed with the compressed, primary air. As noted above, the fuel nozzles 152 of this embodiment are part of the swirler/fuel nozzle assembly. The swirler/fuel nozzle assembly includes a swirler (not shown) that is used to generate turbulence in the primary air. The fuel nozzle 152 injects fuel into the turbulent airflow of the primary air, and the turbulence promotes rapid mixing of the fuel with the primary air. The mixture of the fuel and the compressed air is combusted in the combustion chamber 154, generating combustion gases (combustion products), which accelerate as the combustion gases leave the combustion chamber 154. The products of combustion are accelerated as the products are expelled through the outlet of the combustion chamber 154 to drive the engine 100. More specifically, the combustion products accelerate through the outlet to turn the turbines (e.g., to drive the turbine blades) of the HP turbine 116 and the LP turbine 118. As discussed above, the HP turbine 116 and the LP turbine 118, among other things, drive the LP compressor 110 and the HP compressor 112.

The turbofan engine 100 also includes various accessory systems to aid in the operation of the turbofan engine 100 and/or an aircraft, including the turbofan engine 100. For example, the turbofan engine 100 may include a main lubrication system 162, a compressor cooling air (CCA) system 164, an active thermal clearance control (ATCC) system 166, and a generator lubrication system 168, each of which is depicted schematically in FIG. 2. The main lubrication system 162 is configured to provide a lubricant to, for example, various bearings and gear meshes in the compressor section, the turbine section, the HP shaft 122, and the LP shaft 124. The lubricant provided by the main lubrication system 162 may increase the useful life of such components and may remove a certain amount of heat from such components through the use of one or more heat exchangers. The compressor cooling air (CCA) system 164 provides air from one or both of the HP compressor 112 or the LP compressor 110 to one or both of the HP turbine 116 or the LP turbine 118. The active thermal clearance control (ATCC) system 166 acts to minimize a clearance between tips of turbine blades and casing walls as casing temperatures vary during a flight mission. The generator lubrication system 168 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100. The lubrication systems for the engine 100 (e.g., the main lubrication system 162 and the generator lubrication system 168) may use hydrocarbon fluids, such as oil, for lubrication, in which the oil circulates through inner surfaces of oil scavenge lines.

The turbofan engine 100 discussed herein is, of course, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and the shaft driving the fan 126, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into or otherwise utilized with any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 162, 164, 166, 168, discussed above.

Figure 3:
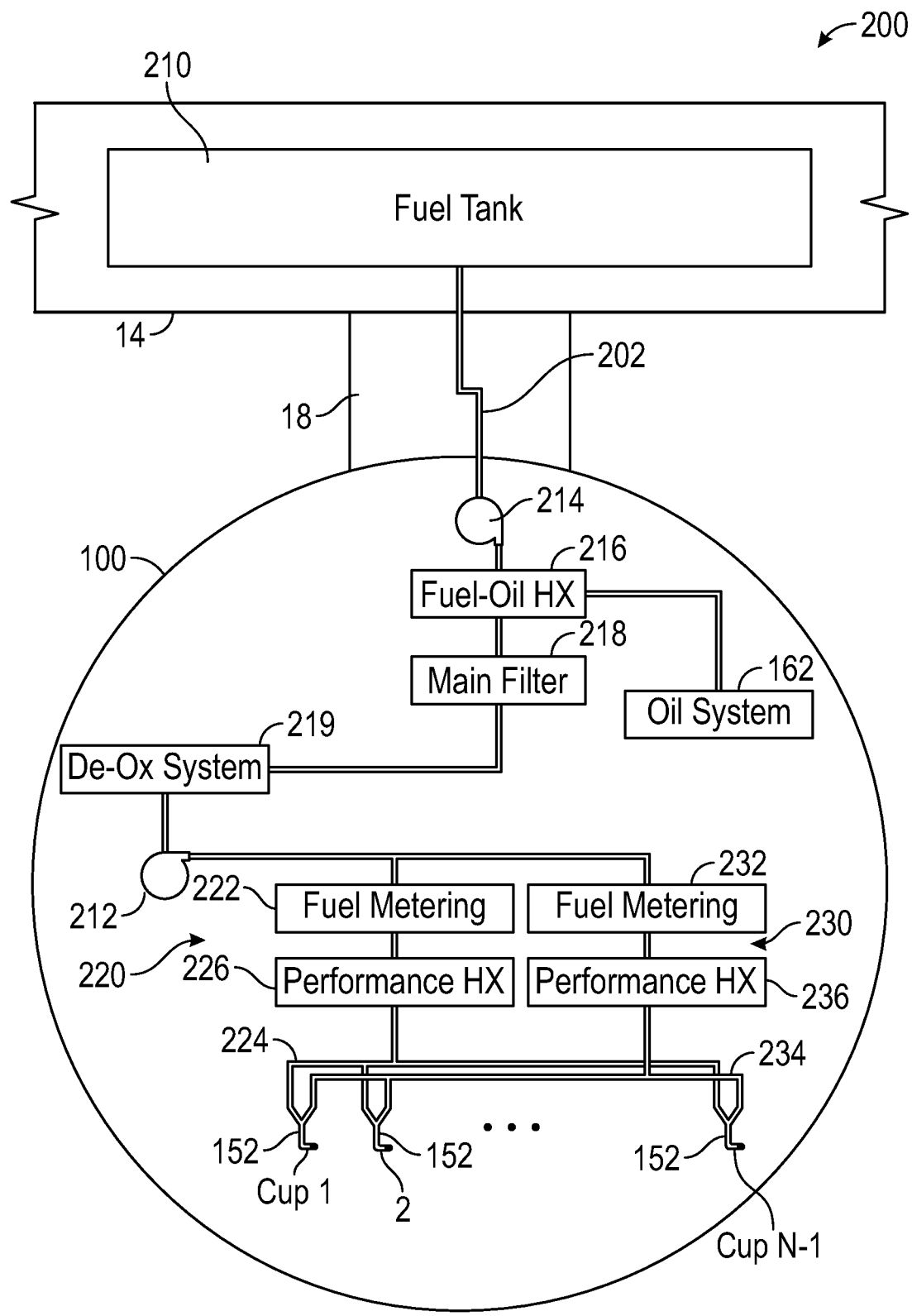
FIG. 3 is a schematic of a fuel system for the gas turbine engine according to an embodiment of the present disclosure.

FIG. 3 is a schematic view of the fuel system 200 according to an embodiment of the present disclosure that is configured to store the hydrocarbon fuel for the engine 100 in the fuel tank 210 and to deliver the hydrocarbon fuel to the engine 100 via the fuel delivery assembly 202. In the following discussion, various components are described as being fluidly connected to the fuel delivery assembly 202 or in fluid connection to the fuel delivery assembly 202. These components are also fluidly connected or coupled to each other by, for example, the fuel delivery assembly 202.

The fuel delivery assembly 202 includes tubes, pipes, conduits, and the like, to fluidly connect the various components of the fuel system 200 to the engine 100. As noted above, the fuel tank 210 is configured to store the hydrocarbon fuel, and the hydrocarbon fuel is supplied from the fuel tank 210 to the fuel delivery assembly 202. The fuel delivery assembly 202 is configured to carry the hydrocarbon fuel between the fuel tank 210 and the engine 100 and, thus, provides a flow path (fluid pathway) of the hydrocarbon fuel from the fuel tank 210 to the engine 100. As noted above, the terms "downstream" and "upstream," as used herein, may be used to describe the position of components relative to the direction of flow of the hydrocarbon fuel in the flow path of the fuel delivery assembly 202. A component positioned downstream from another component is configured to receive fuel from the other component, and, likewise, a component positioned upstream of another component is configured to provide fuel to the other component. The fuel delivery assembly 202 may also include various valves and other components to deliver the hydrocarbon fuel to the engine 100 that are not shown in FIG. 3.

The fuel system 200 includes at least one fuel pump, and, in the embodiment shown in FIG. 3, a plurality of fuel pumps, fluidly connected to the fuel delivery assembly 202 to induce the flow of the fuel through the fuel delivery assembly 202 to the engine 100. One such pump is a main fuel pump 212. The main fuel pump 212 is a high-pressure pump that is the primary source of pressure rise in the fuel delivery assembly 202 between the fuel tank 210 and the engine 100. The main fuel pump 212 may be configured to increase a pressure in the fuel delivery assembly 202 to a pressure greater than a pressure within the combustion chamber 154 of the combustor 150 (see FIG. 2).

The fuel system 200 may also include other supplementary pumps, such as an inlet pump 214. The inlet pump 214 is a low-pressure pump that is configured to provide an initial pressurization to induce a flow of the hydrocarbon fuel through the fuel delivery assembly 202. The inlet pump 214 may be configured to provide less of a pressure rise within the fuel delivery assembly 202 than the main fuel pump 212. The inlet pump 214 may be configured to provide less than eighty percent of the pressure rise of the main fuel pump 212, such as less than seventy percent, such as less than sixty percent, such as less than fifty percent, such as less than forty percent, such as less than thirty percent, such as less than twenty percent, such as at least five percent of the pressure rise of the main fuel pump 212.

In the embodiment shown in FIG. 3, the inlet pump 214 is downstream of the fuel tank 210 and upstream of the main fuel pump 212. Although the inlet pump 214 is shown as being located within the engine 100, the inlet pump 214 may also be suitably located in other portions of the aircraft 10 such as the fuselage 12, the wing 14, or the pylon 18 (see FIG. 1). The inlet pump 214 induces the flow of fuel from the fuel tank 210, and then, the fuel is heated by a preheater 216.

The preheater 216 is in fluid communication with the fuel delivery assembly 202 and may be any suitable heater, such as an electrical resistance heater, a catalytic heater, or a burner. In some embodiments, such as the one depicted in FIG. 3, the preheater 216 may be a heat exchanger that is in thermal communication with any suitable heat source, such as any suitable engine and/or aircraft heat source. Such an engine heat source may include, for example, the main lubrication system 162, and the preheater 216 may be a fuel-oil heat exchanger (HX) fluidly connected to the main lubrication system 162 and configured to extract heat from the oil of the main lubrication system 162 and to heat the hydrocarbon fuel flowing through the preheater 216. The preheater 216 is preferably configured to heat the fuel to temperatures that avoid the formation of ice in the fuel and to cool the oil of the main lubrication system 162. The preheater 216 may be configured to heat the fuel, as measured at the outlet of the preheater 216, to temperatures preferably from zero degrees Fahrenheit to two-hundred degrees Fahrenheit. Although, the preheater 216 is shown as being located within the engine 100, the preheater 216 may also be suitably located in other portions of the aircraft 10, such as the fuselage 12, the wing 14, or the pylon 18 (see FIG. 1).

The fuel system 200 also includes a main filter 218 in fluid communication with the fuel delivery assembly 202. The main filter 218 is configured to remove contaminants that may be present in the fuel supply and is, thus, preferably positioned close to the fuel tank 210 and upstream of many of the major components of the fuel system 200, such as, for example, the main fuel pump 212, a first fuel metering unit 222, a second fuel metering unit 232, and a de-oxygenation system 219. In the embodiment depicted in FIG. 3, the main filter 218 is positioned downstream of the fuel tank 210, the inlet pump 214, and the preheater 216. Although the main filter 218 is shown as being located within the engine 100, the main filter 218 may also be suitably located in other portions of the aircraft 10 such as the fuselage 12, the wing 14, or the pylon 18 (see FIG. 1). The main filter 218 may be any suitable filter, including, for example, a mesh filter. The main filter 218 preferably may have a nominal micron rating from ten microns to fifty microns to remove potential contaminants.

The fuel system 200 includes a plurality of fuel circuits: a first fuel circuit 220 and a second fuel circuit 230. Each of the first fuel circuit 220 and the second fuel circuit 230 is configured to provide fuel to each of the fuel nozzles 152. The first fuel circuit 220 is configured to provide fuel to the fuel nozzle 152 at a first temperature, and the second fuel circuit 230 is configured to provide fuel to the fuel nozzle 152 at a second temperature. Each fuel nozzle 152 may have a plurality of fuel inlets with one of the plurality of inlets configured to receive fuel from the first fuel circuit 220 and another one of the plurality of inlets configured to receive fuel from the second fuel circuit 230. In some embodiments, the fuel nozzle 152 may have a first orifice (or first set of a plurality of orifices) fluidly connected to the first fuel circuit 220 and a second orifice (or second set of a plurality of orifices) fluidly connected to the second fuel circuit 230 such that fuel from each circuit is injected into the combustion chamber 154 by a separate orifice. In other embodiments, other arrangements of fuel injection orifices may be used.

Each of the first fuel circuit 220 and the second fuel circuit 230 includes a fuel metering unit (a first fuel metering unit 222 and a second fuel metering unit 232) in fluid communication with the fuel delivery assembly 202. Any suitable fuel metering unit 222, 232 may be used, including, for example, a metering valve. The first fuel metering unit 222 and the second fuel metering unit 232 are both positioned downstream of the main fuel pump 212. The first fuel metering unit 222 is positioned upstream of a first fuel manifold 224, and the second fuel metering unit 232 is positioned upstream of a second fuel manifold 234. The first fuel manifold 224 is configured to distribute the fuel from the first fuel circuit 220 to each of the fuel nozzles 152, and the second fuel manifold 234 is configured to distribute the fuel from the second fuel circuit 230 to each of the fuel nozzles 152.

The fuel system 200 is configured to provide fuel to each of the first fuel metering unit 222 and the first fuel manifold 224, and the fuel metering units 222, 224 are configured to receive fuel from the fuel tank 210. The first fuel metering unit 222 and the first fuel manifold 224 work together to provide the flow of fuel to the engine 100 in a desired manner. More specifically, the first fuel metering unit 222 is configured to meter the fuel and to provide a desired volume of fuel, at, for example, a desired flow rate, to the first fuel manifold 224, and the second fuel metering unit 232 is configured to meter the fuel and to provide a desired volume of fuel, at, for example, a desired flow rate, to the second fuel manifold 234. The first fuel manifold 224 and the second fuel manifold 234 are fluidly connected to the fuel nozzles 152, and distribute (provide) the fuel received to the plurality of fuel nozzles 152, where, as discussed above, the fuel is injected into the combustion chamber 154 and combusted. Adjusting the first fuel metering unit 222 and the first fuel manifold 224 changes the volume of fuel provided to the combustion chamber 154 and, thus, changes the amount of propulsive thrust produced by the engine 100 to propel the aircraft 10.

In some embodiments, the first fuel metering unit 222 and the second fuel metering unit 232 may operate in concert with each other such that the proportion of fuel flowing from each of the first fuel circuit 220 and the second fuel circuit 230 remains constant as the total flow rate increases or decreases. In other embodiments, the first fuel metering unit 222 and the second fuel metering unit 232 may be individually adjusted. In the embodiment shown in FIG. 3, each of the first fuel circuit 220 and the second fuel circuit 230 includes a fuel metering unit, but other embodiments may be used, including, for example, a single fuel metering unit positioned upstream of both the first fuel circuit 220 and the second fuel circuit 230.

Fuel downstream of the first fuel metering unit 222 and the second fuel metering unit 232 may be heated further to improve gas turbine efficiency, performance, and durability. Fuel may be used as a cooling source to improve aircraft or engine components durability or used to extract heat from core air flowpath 121 or the CCA system 164 to improve engine thermodynamic efficiency. Each of the first fuel circuit 220 and the second fuel circuit 230 may include a heat exchanger, which may be referred to as performance heat exchanger (HX) herein, to heat the fuel in the respective circuit 220, 230. The first fuel circuit 220 may include a first performance heat exchanger 226, and the second fuel circuit 230 may include a second performance heat exchanger 236. The first performance heat exchanger 226 is positioned upstream of the fuel nozzles 152 and, more specifically, upstream of the first fuel manifold 224, and the second performance heat exchanger 236 is positioned upstream of the fuel nozzles 152 and, more specifically, upstream of the second fuel manifold 234.

The first performance heat exchanger 226 and the second performance heat exchanger 236 may be heat exchangers that are each in thermal communication with any suitable heat source, such as any suitable engine and/or aircraft heat source. For example, each of the first performance heat exchanger 226 and the second performance heat exchanger 236 may be in thermal communication with a hot gas path of an engine 100. Such an engine heat source may include, for example, a flow path of heated air through the engine 100, such as the core air flowpath 121. Each of the first performance heat exchanger 226 and the second performance heat exchanger 236 also may be fluidly connected to, for example, the CCA system 164 to cool the HP turbine 116. Each of the first performance heat exchanger 226 and the second performance heat exchanger 236 may be thermally connected to other portions of the core air flowpath 121, including the jet exhaust nozzle section 120. Additionally, or alternatively, in other embodiments, each of the first performance heat exchanger 226 and the second performance heat exchanger 236 may be thermally coupled to an intermediate thermal transfer system, which, in turn, is thermally coupled to one or more systems of the engine 100 or a flowpath for air through the engine 100. Each of the first performance heat exchanger 226 and the second performance heat exchanger 236 may be thermally coupled to the intermediate thermal transfer system to receive heat from these heat sources.

As noted above, each of the first fuel circuit 220 and the second fuel circuit 230 is configured to provide fuel to each of the fuel nozzles 152, with the first fuel circuit 220 providing fuel to the fuel nozzle 152 at a first temperature and the second fuel circuit providing fuel to the fuel nozzle 152 at a second temperature. In this embodiment, the first temperature is greater than the second temperature. The first fuel circuit 220 and, more specifically, the first performance heat exchanger 226 may be configured to heat the fuel to temperatures greater than two hundred degrees Fahrenheit and, more preferably, from three hundred degrees Fahrenheit to nine hundred degrees Fahrenheit. As noted above, providing the fuel to the fuel nozzles 152 at such temperatures improves the efficiency of a gas turbine engine by reducing fuel consumption, particularly, during operating conditions such as takeoff, climb and cruise, but providing the fuel at such temperatures may lead to issues such as an increased risk of flameout. To mitigate the flameout risk, the second fuel circuit 230 provides the fuel to the fuel nozzles 152 at a temperature (the second temperature) that is less than the temperature (the first temperature) of the fuel provided to the fuel nozzles 152 by the first fuel circuit 220. In some embodiments, the second temperature is less than the first temperature by twenty degrees Fahrenheit to five hundred degrees Fahrenheit. The second fuel circuit 230 and, more specifically, the second performance heat exchanger 236 may be configured to heat the fuel to different temperatures for different flight phases. In some embodiments, the second fuel circuit 230 provides the fuel to the fuel nozzles 152 without any additional heating. In such cases, the temperature of the fuel at the outlet of the main fuel pump 212 is sufficient, and the second performance heat exchanger 236 may be omitted from the second fuel circuit 230 or otherwise not operated.

The second temperature is preferably low enough that the heat of the fuel nozzles 152 and other components of the combustor 150 does not vaporize the fuel provided by the second fuel circuit 230 when a pilot chops the throttle. In this way, a flow of liquid fuel can be provided to the combustion chamber 154 (see FIG. 2) even when the throttle is chopped, and flameout can be avoided. The amount of liquid fuel in such conditions does not need to be significant. In some embodiments, the first fuel circuit 220 provides the bulk of the fuel to the fuel nozzles 152, and the ratio of the amount of fuel provided by the first fuel circuit 220 to each fuel nozzle 152 to the amount of fuel provided by the second fuel circuit 230 to each fuel nozzle 152 may be from two tenths to twenty and may vary for different flight phases. For cruise, this ratio may be from five to ten. The reduced temperature of the fuel provided by the second fuel circuit 230 runs counter to the beneficial effects of heating the fuel, and such effects can be mitigated by providing the fuel to the fuel nozzles 152 in these ratios.

As shown in FIG. 3, the fuel system 200 also may include the de-oxygenation system 219 that is configured to reduce the amount of oxygen in the fuel. Oxygen in the fuel may be a contributor to thermal oxidation of the fuel and the generation of coke, particularly, at temperatures greater than three hundred degrees Fahrenheit, and, thus, coking may be an issue in the first fuel circuit 220 and the second fuel circuit 230. In this embodiment, the de-oxygenation system 219 is in fluid communication with the fuel delivery assembly 202 at a position upstream of each of the first fuel circuit 220 and the second fuel circuit 230 and, more specifically, each of the first performance heat exchanger 226 and the second performance heat exchanger 236, such that the de-oxygenation system 219 reduces the oxygen content of the fuel supplied to each of the first performance heat exchanger 226 and the second performance heat exchanger 236. As shown in FIG. 3, the de-oxygenation system 219 also is upstream of the first fuel metering unit 222, the second fuel metering unit 232, and the main fuel pump 212. The de-oxygenation system 219 is downstream of the main filter 218, and, more specifically, directly downstream of the main filter 218. A suitable de-oxygenation system 219 is the fuel oxygen reduction units shown and described in U.S. Patent Application Publication No. 2020/0140114, the disclosure of which is incorporated by reference herein in its entirety. The fuel provided by the de-oxygenation system 219 may have an oxygen content of less than five parts per million ("ppm"), such as less than three ppm, such as less than two ppm, such as less than one ppm, and such as less than a half ppm.

Figure 4:
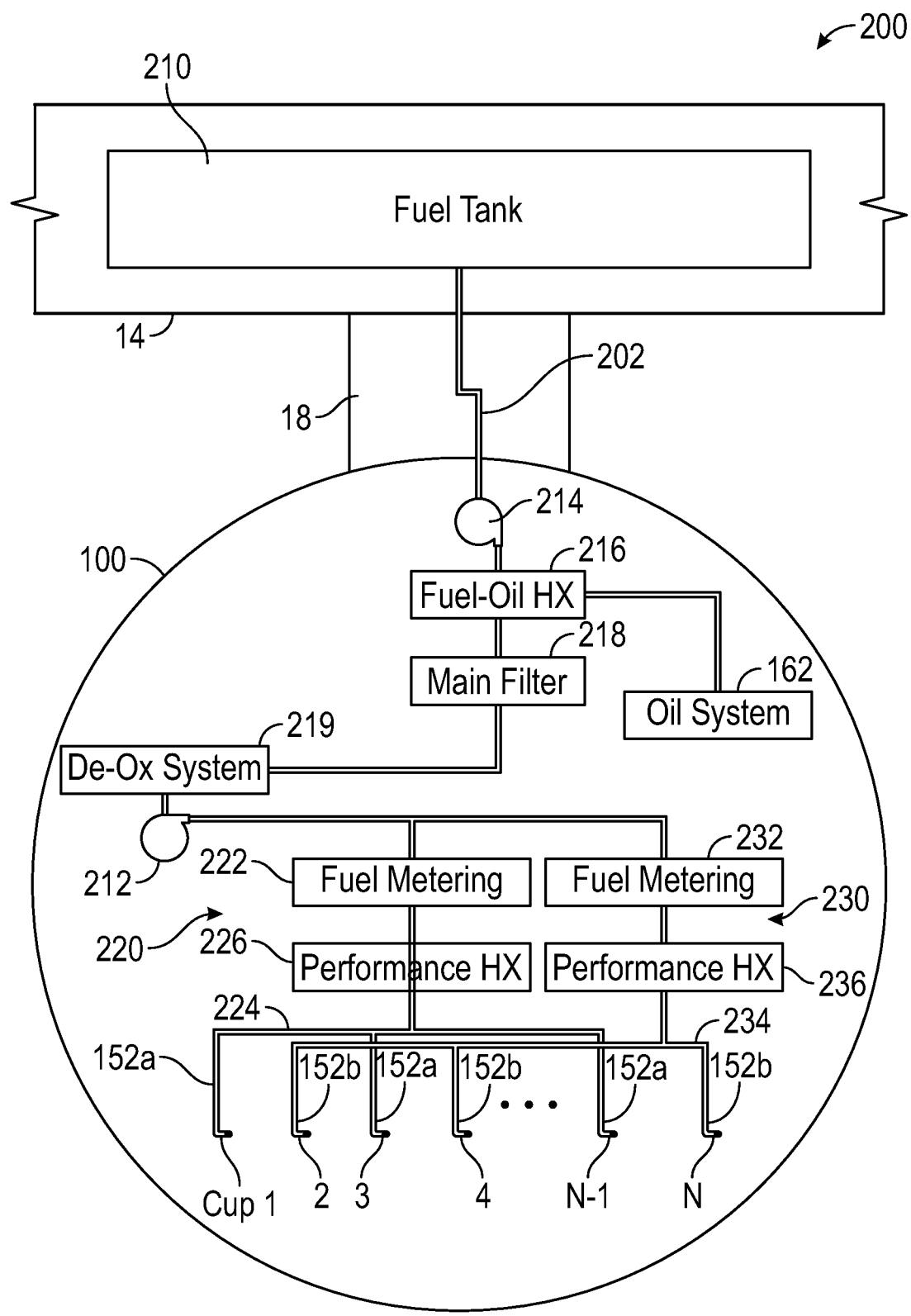
FIG. 4 is a schematic of a fuel system for the gas turbine engine according to an embodiment of the present disclosure.

FIG. 4 is a schematic view of the fuel system 200 according to another embodiment of the present disclosure. The embodiment shown in FIG. 4 includes many of the same or similar components as the embodiment shown in FIG. 3. The same reference numeral is used for the same or similar components in these two embodiments, and a detailed description of these components is omitted here. In the embodiment shown in FIG. 3, each of the first fuel circuit 220 and the second fuel circuit 230 provides fuel to each of the fuel nozzles 152. In the embodiment shown in FIG. 4, however, the first fuel manifold 224 is fluidly connected to a first set of fuel nozzles, including a plurality of first fuel nozzles 152a. The first fuel manifold 224 distributes (provides) the fuel received to each first fuel nozzle 152a of the first set of fuel nozzles. The second fuel manifold 234 is fluidly connected to a second set of fuel nozzles, including a plurality of second fuel nozzles 152b. The second fuel manifold 234 distributes (provides) the fuel received to each second fuel nozzle 152b of the second set of fuel nozzles. In this embodiment, the first fuel nozzles 152a and the second fuel nozzles 152b are arranged in an alternating fashion, such that one of the first fuel nozzles 152a is adjacent to two second fuel nozzles 152b, and one of the second fuel nozzle 152b is adjacent to two first fuel nozzles 152a. In the embodiment shown in FIG. 4, for example, the first fuel nozzles 152a are located in cups 1, 3, and N−1 and the second fuel nozzles 152b are located in cups 2, 4, and N. Other arrangements, however, may be used where two or three fuel nozzles from the same set may be positioned adjacent to each other. Although shown with two fuel circuits, other embodiments may include three or more fuel circuits.

The primary air flowing into and through the combustion chamber 154, as well as the combustion process, has some pressure oscillations and heat release oscillations. The pressure and heat release oscillations in one cup may interact with the oscillations of adjacent cups, forming a feedback loop that may increase the amplitude of these oscillations in combustion chamber (so-called combustion dynamics). Large increases in the oscillations can cause damage to components of the engine 100 and, more specifically, the combustor 150. The embodiment shown in FIG. 4 can mitigate such combustion dynamics. Fuel flowing from a first fuel nozzle 152a has a different temperature than the fuel flowing from an adjacent second fuel nozzle 152b. As a result, the combustion and pressure oscillations are different between the two adjacent fuel nozzles 152a, 152b, reducing the likelihood that the oscillations would interact in such a way to increase in amplitude. To mitigate these combustion dynamics, the first temperature may be less than the second temperature by twenty degrees Fahrenheit to five hundred degrees Fahrenheit. In addition, by such differences in temperature, the combustor average $NO_x$ emissions can be reduced as compared to uniform temperatures between the fuel nozzles 152.

Figure 5:
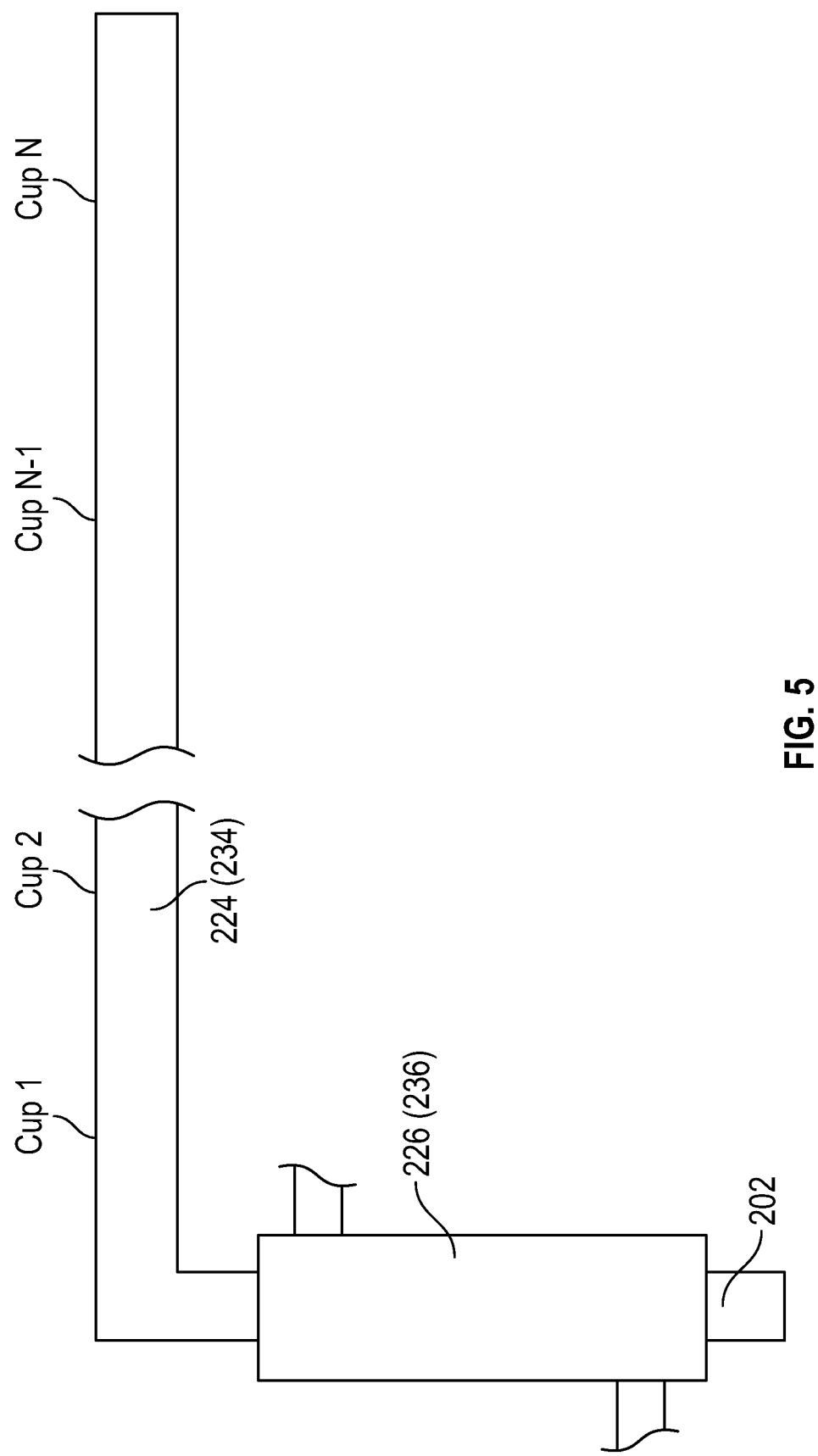
FIG. 5 shows an arrangement of a heat exchanger that may be used in the fuel systems shown in FIGS. 3 and 4.

FIG. 5 shows an arrangement of the first performance heat exchanger 226 that may be used in the fuel systems discussed above. In this embodiment, the first performance heat exchanger 226 is a heat exchanger that surrounds a pipe of the fuel delivery assembly 202 that provides fuel to the first fuel manifold 224. Although described with respect to the first fuel circuit 220 and the first performance heat exchanger 226, this arrangement may also be used with the second performance heat exchanger 236 in the second fuel circuit 230.

Figure 6:
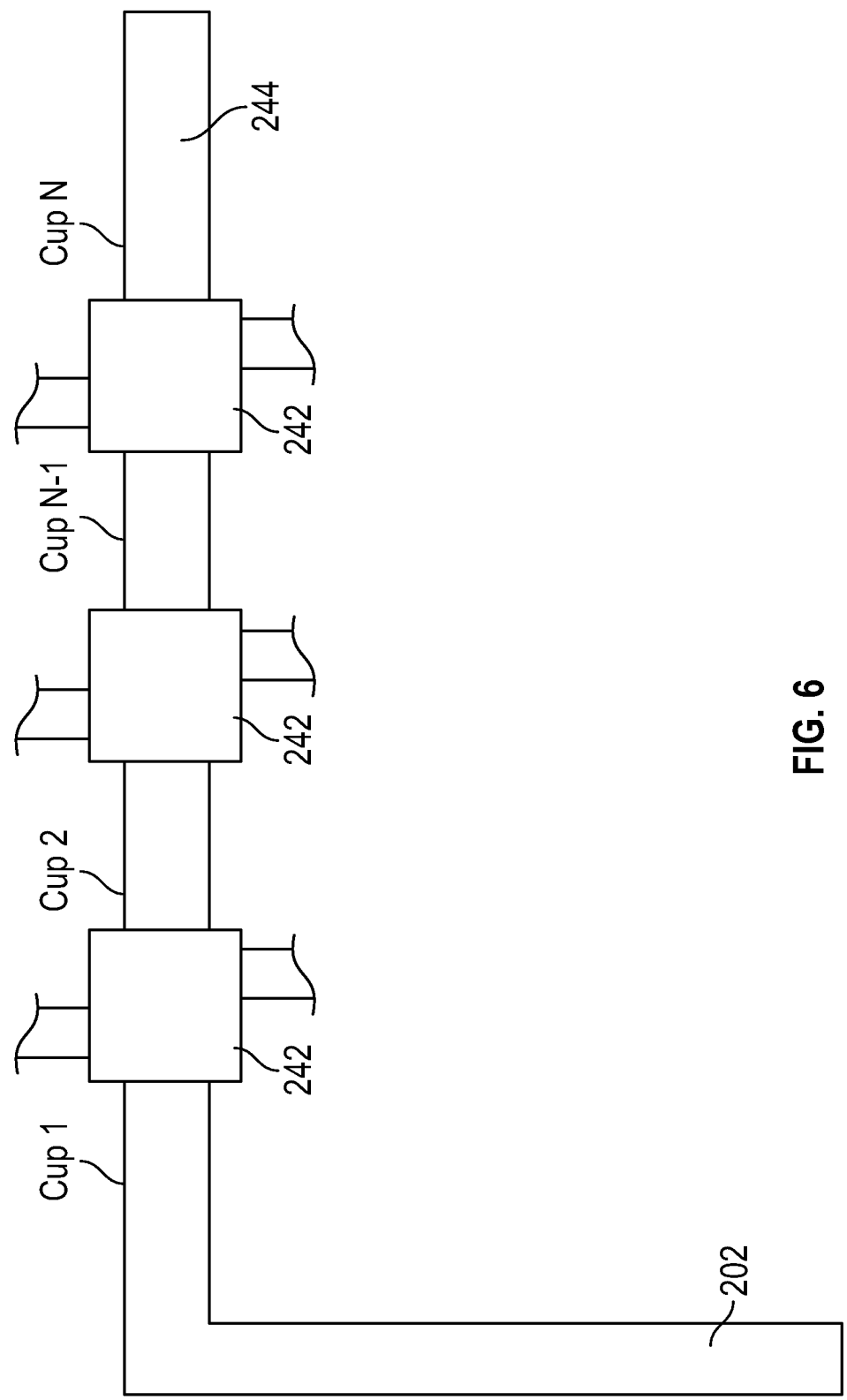
FIG. 6 shows another arrangement of a heat exchanger that may be used in the fuel systems shown in FIGS. 3 and 4.

FIG. 6 shows an arrangement of a heat exchanger 242 that may be provided with a fuel manifold 244. In the embodiment shown in FIG. 4, a plurality of fuel circuits (the first fuel circuit 220 and the second fuel circuit 230) were used to supply fuel to adjacent fuel nozzles 152 at different temperatures to mitigate the oscillation and combustion dynamics. In this aspect, a plurality of heat exchangers 242 are used to adjust the temperatures. The heat exchanger 242 of this embodiment is configured like the first performance heat exchanger 226 discussed above with reference to FIG. 5 and may be thermally coupled to any suitable heat source as discussed above for the first performance heat exchanger 226. Alternatively, one or more of the heat exchangers 242 of this embodiment may be thermally coupled to a cooling source to reduce the temperature of the fuel. Such cooling sources include, for example, air flowing through the core air flowpath 121. The fuel manifold 244 is configured similar to the first fuel manifold 224 and the second fuel manifold 234 discussed above and is fluidly connected to the fuel nozzles 152 (shown in FIG. 6 as cups). The fuel manifold 244 distributes (provides) the fuel received to each of the cups, and in some embodiments a single fuel circuit including the fuel manifold 244 may be used. The fuel manifold 244 is a pipe between adjacent cups, and, in this embodiment, each of the heat exchangers 242 surrounds the pipes (fuel manifold 244) between adjacent cups (fuel nozzles).

In this embodiment, a heat exchanger 242 may be placed between adjacent cups and used to heat the fuel provided to adjacent cups (fuel nozzles 152) to different temperatures, thereby mitigating the combustion dynamics as discussed above. The heat exchangers 242 in this embodiment may be configured to provide fuel to each of the cups with the temperature differentials discussed above with respect to FIG. 4. As shown in FIG. 6, for example, one of the heat exchangers 242 may be fluidly positioned downstream of cup 1 (a first fuel nozzle) and upstream of cup 2 (a second nozzle). The fuel is provided to cup 1 at the temperature of the fuel circuit. Fuel flowing past the cup 1 is heated or cooled by the heat exchanger 242 and provided to cup 2 at a different temperature. In the embodiment shown in FIG. 6, the heat exchanger 242 is positioned between each of the cups (fuel nozzles 152), but other arrangements may be used, such as an arrangement with heat exchangers 242 positioned with two or more cups therebetween.

Figure 7:
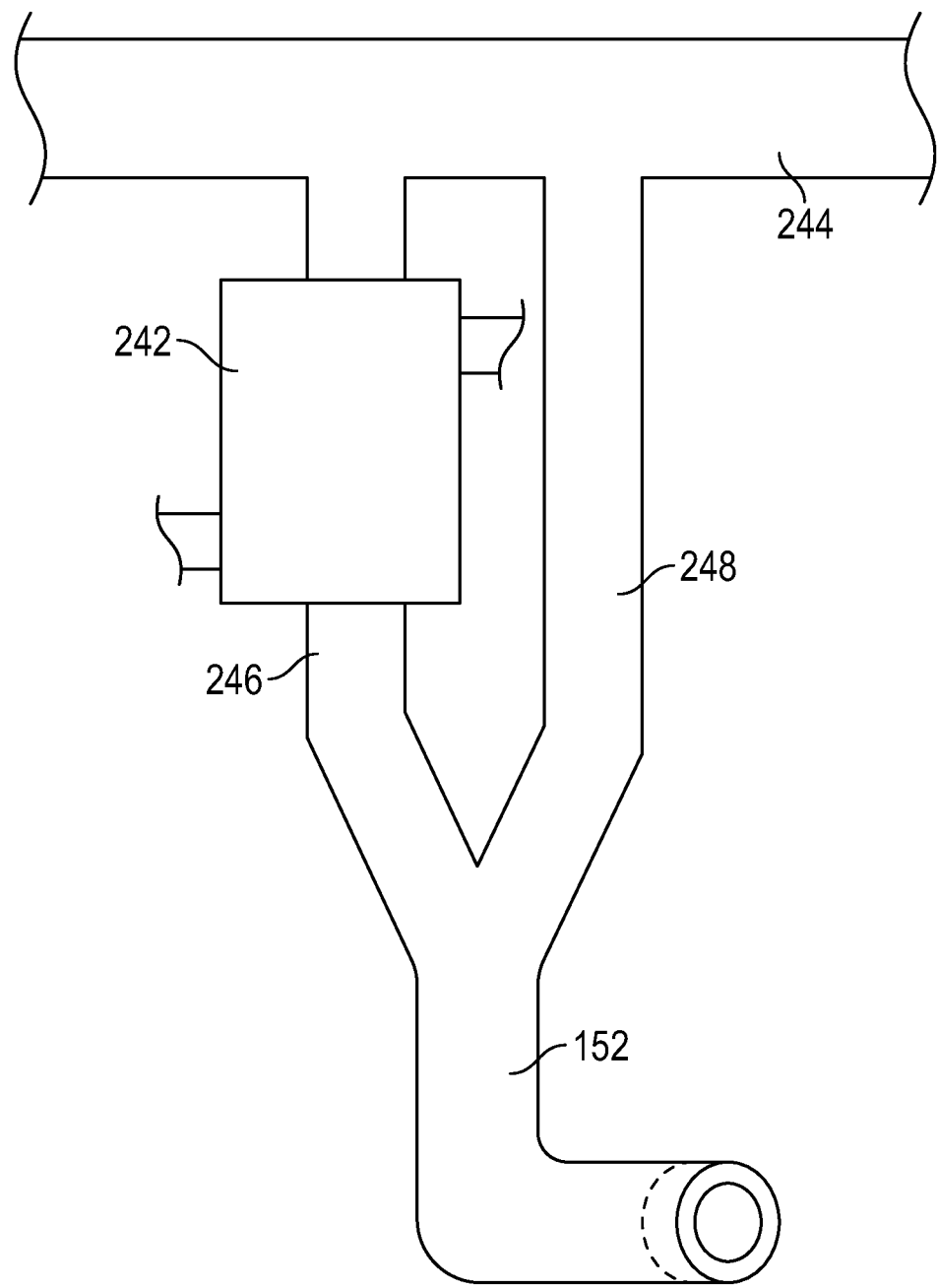
FIG. 7 shows a further arrangement of a heat exchanger that may be used in the fuel systems shown in FIGS. 3 and 4.

FIG. 7 shows another arrangement of the heat exchanger 242. In the arrangement shown in FIG. 6, the heat exchanger 242 was located around the fuel manifold 244. In FIG. 7, the fuel nozzle 152 is fluidly connected to the fuel manifold 244 by at least one fuel supply line. In this embodiment, the fuel nozzle 152 is fluidly connected to the fuel manifold 244 by a first fuel supply line 246 and a second fuel supply line 248. Each fuel nozzle may include a plurality of fuel inlets including a first inlet fluidly connected to the first fuel supply line 246 to receive fuel from the first fuel supply line 246 and a second inlet fluidly connected to the second fuel supply line 248 to receive fuel from the second fuel supply line 248. Instead of (or in addition to) placing the heat exchanger 242 around the fuel manifold 244, the heat exchanger 242 may be placed around at least one fuel supply line downstream of the fuel manifold 244 and upstream of the fuel nozzles 152. In this embodiment, the heat exchanger 242 is placed around the first fuel supply line 246, and a heat exchanger 242 is not placed around the second fuel supply line 248. In addition to controlling the temperature of the fuel by the heat flowing into the heat exchanger 242, the temperature of the fuel flowing out of the fuel nozzles 152 may be controlled by controlling the distribution (ratio) of the fuel flowing between each of the first fuel supply line 246 and the second fuel supply line 248.

These embodiments discussed herein may be used to mitigate the effects of fuel flow oscillations and other combustion dynamics, and thereby preventing combustion issues such as flameout. Further aspects of the present disclosure are provided by the subject matter of the following clauses.

A gas turbine engine including a combustor, a plurality of fuel nozzles, a first fuel circuit, and a second fuel circuit. The combustor includes a combustion chamber. The plurality of fuel nozzles inject fuel into the combustion chamber of the combustor. The first fuel circuit includes a first fuel manifold fluidly connected to at least one fuel nozzle of the plurality of fuel nozzles to distribute the fuel to the at least one fuel nozzle at a first temperature. The second fuel circuit includes a second fuel manifold fluidly connected to at least one fuel nozzle of the plurality of fuel nozzles to distribute the fuel to the at least one fuel nozzle at a second temperature. The second temperature is less than the first temperature.

The gas turbine engine of the preceding clause, wherein the first temperature is higher than two hundred degrees Fahrenheit.

The gas turbine engine of any preceding clause, wherein the second temperature is less than the first temperature by twenty degrees Fahrenheit to five hundred degrees Fahrenheit.

The gas turbine engine of any preceding clause, wherein the first fuel circuit and the second fuel circuit are fluidly connected to each fuel nozzle of the plurality of fuel nozzles to provide fuel to each fuel nozzle of the plurality of fuel nozzles. Each fuel nozzle has a plurality of fuel inlets. One of the plurality of fuel inlets is fluidly coupled to the first fuel circuit to receive the fuel from the first fuel circuit, and another one of the plurality of fuel inlets is fluidly coupled to the to the second fuel circuit to receive fuel from the second fuel circuit.

The gas turbine engine of any preceding clause, wherein the second fuel circuit includes a heat exchanger thermally coupled to a heat source to heat the fuel to the second temperature.

The gas turbine engine of any preceding clause, wherein the heat exchanger is upstream of the second fuel manifold relative to the flow of the fuel in the second fuel circuit.

The gas turbine engine of any preceding clause, wherein the first fuel circuit includes a heat exchanger thermally coupled to a heat source to heat the fuel to the first temperature.

The gas turbine engine of any preceding clause, wherein the heat exchanger is upstream of the first fuel manifold relative to the flow of the fuel in the first fuel circuit.

The gas turbine engine of any preceding clause, further including a core air flowpath having a compressor section, the combustor, and a turbine section, one of the compressor section, the combustor, or the turbine section being the heat source.

The gas turbine engine of any preceding clause, wherein the plurality of fuel nozzles includes a first nozzle and a second nozzle. The second nozzle is adjacent to the first nozzle. The first nozzle is fluidly coupled to the first fuel manifold to receive the fuel from the first fuel manifold. The second nozzle is fluidly coupled to the second fuel manifold to receive the fuel from the second fuel manifold.

The gas turbine engine of any preceding clause, wherein the first nozzle is one nozzle of a plurality of a first set of fuel nozzles, and the second nozzle is one nozzle of a plurality of a second set of fuel nozzles.

The gas turbine engine of any preceding clause, wherein the fuel nozzles of the first set of fuel nozzles and the fuel nozzles of the second set of fuel nozzles are arranged in an alternating fashion, such that one fuel nozzle of the first set of fuel nozzles is adjacent to two fuel nozzles of the second set of fuel nozzles and one fuel nozzle of the second set of fuel nozzles is adjacent to two fuel nozzles of the first set of fuel nozzles.

A gas turbine engine including a combustor, a plurality of fuel nozzles, a fuel manifold, and at least one heat exchanger. The combustor including a combustion chamber. The plurality of fuel nozzles inject fuel into the combustion chamber of the combustor. The plurality of fuel nozzles include a first fuel nozzle and a second fuel nozzle. The fuel manifold is fluidly connected to the plurality of fuel nozzles to distribute the fuel to the fuel nozzles and to provide the fuel to the first fuel nozzle at a first temperature. The at least one heat exchanger is positioned downstream of the first fuel nozzle and upstream of the second fuel nozzle. The heat exchanger is connected to the fuel manifold such that the fuel manifold provides the fuel to the second fuel nozzle at a second temperature different from the first temperature.

The gas turbine engine of any preceding clause, further including a plurality of heat exchangers. At least one fuel nozzle of the plurality of fuel nozzles is located between adjacent heat exchangers of the plurality of heat exchangers.

The gas turbine engine of any preceding clause, wherein the fuel manifold is a pipe, and the heat exchanger surrounds the pipe.

The gas turbine engine of any preceding clause, wherein the first temperature is higher than two hundred degrees Fahrenheit.

The gas turbine engine of any preceding clause, wherein the second temperature is greater than the first temperature by twenty degrees Fahrenheit to two hundred degrees Fahrenheit.

A gas turbine engine including, a combustor a plurality of fuel nozzles, a fuel manifold, a first fuel supply line, a second fuel supply line, and a heat exchanger. The combustor includes a combustion chamber. The plurality of fuel nozzles inject fuel into the combustion chamber of the combustor. Each fuel nozzle includes a plurality of fuel inlets including a first inlet and a second inlet. The fuel manifold is fluidly connected to the plurality of fuel nozzles to distribute the fuel to each fuel nozzle of the plurality of fuel nozzles at a first temperature. The first fuel supply line fluidly connects the first inlet to the fuel manifold. The second fuel supply line fluidly connects the second inlet to the fuel manifold. The heat exchanger is fluidly connected to the first fuel supply line. The heat exchanger is positioned downstream of the fuel manifold and upstream of the fuel nozzle and is thermally coupled to a heat source to heat the fuel to a second temperature different from the first temperature The gas turbine engine of any preceding clause, wherein the first fuel supply line is a pipe, and the heat exchanger surrounds the pipe.

The gas turbine engine of any preceding clause, wherein the second temperature is greater than the first temperature by twenty degrees Fahrenheit to two hundred degrees Fahrenheit.

Although the foregoing description is directed to the preferred embodiments, other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:
1. A gas turbine engine comprising:
a fuel conduit fluidly coupled to a fuel source to receive fuel from the fuel source;
a first fuel circuit fluidly coupled to the fuel conduit to receive a first portion of the fuel from the fuel source, the first fuel circuit including a first fuel manifold to distribute the first portion of the fuel at a first temperature;
a second fuel circuit arranged in parallel with first fuel circuit and fluidly coupled to the fuel conduit to receive a second portion of the fuel from the fuel source, the second fuel circuit including a second fuel manifold to distribute the second portion of the fuel at a second temperature, the second temperature being less than the first temperature;

a combustor including a combustion chamber; and a plurality of fuel nozzles that inject the first portion of the fuel and the second portion of the fuel into the combustion chamber of the combustor, each fuel nozzle of the plurality of fuel nozzles being fluidly connected to both the first fuel circuit via the first fuel manifold to receive the first portion of the fuel at the first temperature and the second fuel circuit via the second fuel manifold to receive the second portion of the fuel at the second temperature, each fuel nozzle of the plurality of fuel nozzles being fluidly connected to both the first fuel circuit and the second fuel circuit to receive the first portion of the fuel at the first temperature simultaneously with the second portion of the fuel at the second temperature.

2. The gas turbine engine of claim 1, wherein the first temperature is from three hundred degrees Fahrenheit to nine hundred degrees Fahrenheit.

3. The gas turbine engine of claim 1, wherein the second temperature is less than the first temperature by twenty degrees Fahrenheit to five hundred degrees Fahrenheit.

4. The gas turbine engine of claim 1, wherein each fuel nozzle of the plurality of fuel nozzles has a plurality of fuel inlets, one of the plurality of fuel inlets of each fuel nozzle of the plurality of fuel nozzles being fluidly coupled to the first fuel circuit to receive the first portion of the fuel from the first fuel circuit and another one of the plurality of fuel inlets of each fuel nozzle of the plurality of fuel nozzles being fluidly coupled to the second fuel circuit to receive first portion of the fuel from the second fuel circuit.

5. The gas turbine engine of claim 1, wherein the second fuel circuit includes a heat exchanger thermally coupled to a heat source to heat the second portion of the fuel to the second temperature.

6. The gas turbine engine of claim 5, wherein the heat exchanger is upstream of the second fuel manifold relative to the second portion of the fuel flowing in the second fuel circuit.

7. The gas turbine engine of claim 1, wherein the first fuel circuit includes a heat exchanger thermally coupled to a heat source to heat the first portion of the fuel to the first temperature.

8. The gas turbine engine of claim 7, wherein the heat exchanger is upstream of the first fuel manifold relative to the first portion of the fuel flowing in the first fuel circuit.

9. The gas turbine engine of claim 7, further comprising a core air flowpath including a compressor section, the combustor, and a turbine section, one of the compressor section, the combustor, or the turbine section being the heat source.

10. The gas turbine engine of claim 1, wherein the combustor is an annular combustor.

11. The gas turbine engine of claim 10, wherein the plurality of fuel nozzles is arranged in an annular configuration.

12. The gas turbine engine of claim 10, wherein the plurality of fuel nozzles is aligned in a circumferential direction of the combustor.

13. The gas turbine engine of claim 1, wherein the first fuel circuit includes a first fuel metering unit fluidly connected to the first fuel manifold, the second fuel circuit includes a second fuel metering unit fluidly connected to the second fuel manifold.

14. The gas turbine engine of claim 13, wherein the first fuel metering unit is upstream of the first fuel manifold relative to the first portion of the fuel flowing in the first fuel circuit, and the first fuel metering unit is operable to provide a first flowrate of the first portion of the fuel to the first fuel manifold, and wherein the second fuel metering unit is upstream of the second fuel manifold relative to the second portion of the fuel flowing in the second fuel circuit, and the second fuel metering unit is operable to provide a second flowrate of the second portion of the fuel to the second fuel manifold.

15. The gas turbine engine of claim 14, wherein the first fuel metering unit and the second fuel metering unit are configured to operate in concert with each other to maintain a constant fuel ratio of the first flowrate to the second flowrate when changing each of the first flowrate and the second flowrate.

16. The gas turbine engine of claim 14, wherein a ratio of the first flowrate to the second flowrate is from two tenths to twenty.

17. The gas turbine engine of claim 14, wherein a ratio of the first flowrate to the second flowrate is from five to ten.

18. The gas turbine engine of claim 14, wherein in each fuel nozzle of the plurality of fuel nozzles, each fuel nozzle includes a common fuel flow path fluidly connected to both the first fuel circuit and the second fuel circuit to receive the first portion of the fuel at the first temperature and the second portion of the fuel at the second temperature, respectively therefrom.

* * * * *